(12) United States Patent
Malboubi et al.

(10) Patent No.: US 10,721,144 B2
(45) Date of Patent: Jul. 21, 2020

(54) VIRTUALIZED INTELLIGENT AND INTEGRATED NETWORK MONITORING AS A SERVICE

(71) Applicant: AT&T Intellectual Property I, L.P., Atlanta, GA (US)

(72) Inventors: Mehdi Malboubi, San Ramon, CA (US); Abhijeet Bhorkar, Fremont, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 68 days.

(21) Appl. No.: 15/852,342

(22) Filed: Dec. 22, 2017

(65) Prior Publication Data
US 2019/0199605 A1 Jun. 27, 2019

(51) Int. Cl.
*G06F 15/16* (2006.01)
*H04L 12/26* (2006.01)
*H04L 29/06* (2006.01)
*H04L 12/24* (2006.01)

(52) U.S. Cl.
CPC ........ *H04L 43/045* (2013.01); *H04L 41/5012* (2013.01); *H04L 43/08* (2013.01); *H04L 43/12* (2013.01); *H04L 63/1408* (2013.01); *H04L 63/0272* (2013.01)

(58) Field of Classification Search
CPC ....... H04L 43/045; H04L 43/08; H04L 43/12; H04L 63/1408; H04L 63/0272
See application file for complete search history.

(56) References Cited

U.S. PATENT DOCUMENTS

| 6,880,002 B2 * | 4/2005 | Hirschfeld ............ G06F 9/5077 709/223 |
| 7,574,496 B2 | 8/2009 | McCrory et al. |
| 7,987,228 B2 * | 7/2011 | McKeown .......... H04L 12/2801 379/1.01 |

(Continued)

OTHER PUBLICATIONS

Chen et al., "Cloud-based Wireless Network: Virtualized, Reconfigurable, Smart Wireless Network to Enable 5G Technologies," Mobile Networks and Applications 20.6, Feb. 27, 2015, pp. 704-712.

*Primary Examiner* — Sm A Rahman
(74) *Attorney, Agent, or Firm* — Harmen & Citrin LLC

(57) ABSTRACT

Concepts and technologies for providing virtualized network monitoring as a service are provided. In an embodiment, a method can include providing, by a processor of a computer system within a service host network, a network monitoring portal to a user equipment associated with a private network. The method also can include receiving, from the user equipment via the network monitoring portal, access credentials that enable access to the private network. The method can include receiving a selection of a plurality of network monitoring service modules for monitoring the private network, and instantiating a plurality of virtual network monitoring probes that each correspond to at least one of the plurality of network monitoring service modules selected. The method can include injecting the plurality of virtual network monitoring probes within the private network, where the virtual network monitoring probes are activated in response to being injected within the private network.

20 Claims, 5 Drawing Sheets

(56) References Cited

U.S. PATENT DOCUMENTS

| | | |
|---|---|---|
| 9,467,385 B2 | 10/2016 | Raney |
| 9,571,516 B1 | 2/2017 | Curcic et al. |
| 9,680,715 B2 | 6/2017 | Abuelsaad et al. |
| 9,680,728 B2 | 6/2017 | Besser |
| 2010/0293610 A1* | 11/2010 | Beachem .............. G06F 21/552 726/15 |
| 2011/0126197 A1 | 5/2011 | Larsen et al. |
| 2013/0218882 A1* | 8/2013 | McConnell ....... G06F 16/24524 707/728 |
| 2016/0182336 A1 | 6/2016 | Doctor et al. |
| 2016/0337451 A1 | 11/2016 | Li et al. |

* cited by examiner

VIRTUALIZED INTELLIGENT AND INTEGRATED NETWORK MONITORING AS A SERVICE

BACKGROUND

As computing demands fluctuate, commercial enterprises are frequently turning to a distributed computing architecture to meet their computing needs, such as via use of cloud computing. Cloud computing generally refers to a computing environment with dynamically scalable resources that may be virtualized and available for user access in diverse computing locations. In some instances, commercial enterprises may configure a cloud computing environment to be a private network that allows their employees and users to connect, utilize, and communicate workloads across the cloud environment. However, concerns regarding cost, performance, latency, reliability, and security may present significant challenges for commercial enterprises who may be attempting to operate their private network in an economically viable manner. Conventional techniques for managing and controlling private networks may leave the data streams visible to various computing systems, thereby increasing privacy concerns of the commercial enterprises. Moreover, conventional solutions may rely on reactive network problem solving in which an electronic trouble ticket is submitted for review by a human operator that may only receive limited and/or solid information from the electronic trouble ticket. These conventional techniques may leave the private network exposed to computing threats and inefficiency.

SUMMARY

The present disclosure is directed to providing intelligent and integrated virtual network monitoring as a service. According to one aspect of the concepts and technologies disclosed herein, a method is disclosed. In some embodiments, the method can include providing, by a processor of a computer system within a service host network, a network monitoring portal to a user equipment associated with a private network. The method can include receiving, by the processor from the user equipment via the network monitoring portal, access credentials that enable access to the private network. The method can further include receiving, by the processor from the network monitoring portal, a selection of a plurality of network monitoring service modules for monitoring the private network. In some embodiments, the plurality of network monitoring service modules can include at least one of a network measurement service module, a network vulnerability service module, a network inference service module, an anomaly detection service module, and a network visualization service module. In some embodiments, the network monitoring service modules also can include a network performance optimization service module and a network traffic engineering service module. The method can further include instantiating, by the processor, a plurality of virtual network monitoring probes that each correspond to at least one of the plurality of network monitoring service modules selected. In some embodiments, the plurality of virtual network probes are configured to send a data file stream to a network measurement adapter of the service host network. The method can also include injecting, by the processor via the access credentials, the plurality of virtual network monitoring probes within the private network. In some embodiments, the virtual network monitoring probes are activated in response to being injected within the private network.

In some embodiments, the method can further include obtaining, by the processor of the service host network, the data file stream via the network measurement adapter. In some embodiments, the data file stream can include a plurality of raw network measurements. The method can further include anonymizing, by the processor of the service host network, the plurality of raw network measurements within the data file stream. In response to anonymizing, the method also can include directing the plurality of raw network measurements to at least one of the plurality of network monitoring service modules.

In some embodiments, the method can include concatenating, by the processor, the plurality of raw network measurements with a service host network data stream and historical data in a data lake prior to directing the plurality of raw network measurements to at least one of the plurality of network monitoring service modules. In some embodiments, the method also can include determining, by the processor, a performance indicator via execution of at least one of the plurality of network monitoring service modules, and building, by the processor, a visualization based on the performance indicator. In some embodiments, the method can include providing, by the processor of the service host network, the visualization and the performance indicator to the user equipment via the network monitoring portal.

According to another aspect of the concepts and technologies disclosed herein, a system is disclosed. The system can include a processor and a memory. The memory can store computer-executable instructions that, when executed by the processor, cause the processor to perform operations. The operations can include providing a network monitoring portal to a user equipment associated with a private network. The operations can also include receiving, from the user equipment via the network monitoring portal, access credentials that enable access to the private network. The operations can further include receiving, via the network monitoring portal, selection of a plurality of network monitoring service modules for monitoring the private network. In some embodiments, the plurality of network monitoring service modules can include at least one of a network measurement service module, a network vulnerability service module, a network inference service module, an anomaly detection service module, and a network visualization service module. In some embodiments, the network monitoring service modules also can include a network performance optimization service module and a network traffic engineering service module. The operations also can include instantiating a plurality of virtual network monitoring probes corresponding to at least one of the plurality of network monitoring service modules selected. The operations can further include injecting, via the access credentials, the plurality of virtual network monitoring probes within the private network. In some embodiments, the virtual network probe is activated in response to being injected within the private network. In some embodiments, the plurality of virtual network probes are configured to send a data file stream to a network measurement adapter of the service host network.

In some embodiments, the operations further include obtaining the data file stream via the network measurement adapter. In some embodiments, the data file stream can include a plurality of raw network measurements. The operations also can include anonymizing the plurality of raw network measurements within the data file stream, and in response to anonymizing, directing the plurality of raw network measurements to at least one of the plurality of network monitoring service modules. In some embodiments, the operations can further include concatenating the plurality of raw network measurements with a service host network data stream and historical data in a data lake prior to directing the plurality of raw network measurements to at least one of the plurality of network monitoring service modules. In some embodiments, the operations can include determining a performance indicator via execution of at least one of the plurality of network monitoring service modules, and building a visualization based on the performance indicator. In some embodiments, the operations also can include providing the visualization and the performance indicator to the user equipment via the network monitoring portal.

According to yet another aspect, a computer storage medium is disclosed. The computer storage medium can have computer-executable instructions stored thereon. When the computer-executable instructions are executed by a processor, the processor can perform operations including providing a network monitoring portal to a user equipment associated with a private network. The operations can include receiving, from the user equipment via the network monitoring portal, access credentials that enable access to the private network. The operations also can include receiving, via the network monitoring portal, a selection of a plurality of network monitoring service modules for monitoring the private network. In some embodiments, the plurality of network monitoring service modules can include at least one of a network measurement service module, a network vulnerability service module, and a network inference service module, an anomaly detection service module, a network visualization service module. In some embodiments, the network monitoring service modules also can include a network performance optimization service module and a network traffic engineering service module. The operations also can include instantiating a plurality of virtual network monitoring probes that each correspond to at least one of the plurality of network monitoring service modules selected. In some embodiments, the plurality of virtual network probes are configured to send a data file stream to a network measurement adapter of the service host network. The operations also can include injecting, via the access credentials, the plurality of virtual network monitoring probes within the private network. In some embodiments, the virtual network monitoring probes are activated in response to being injected within the private network.

In some embodiments, the operations also can include obtaining the data file stream via the network measurement adapter. The data file stream can include a plurality of raw network measurements. The operations also can include anonymizing the plurality of raw network measurements within the data file stream, and in response to anonymizing, directing the plurality of raw network measurements to at least one of the plurality of network monitoring service modules. In some embodiments, the operations can further include concatenating the plurality of raw network measurements with a service host network data stream and historical data in a data lake prior to directing the plurality of raw network measurements to at least one of the plurality of network monitoring service modules. In some embodiments, the operations also can include determining a performance indicator via execution of at least one of the plurality of network monitoring service modules. The operations can also include building a visualization based on the performance indicator, and providing the visualization and the performance indicator to the user equipment via the network monitoring portal.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
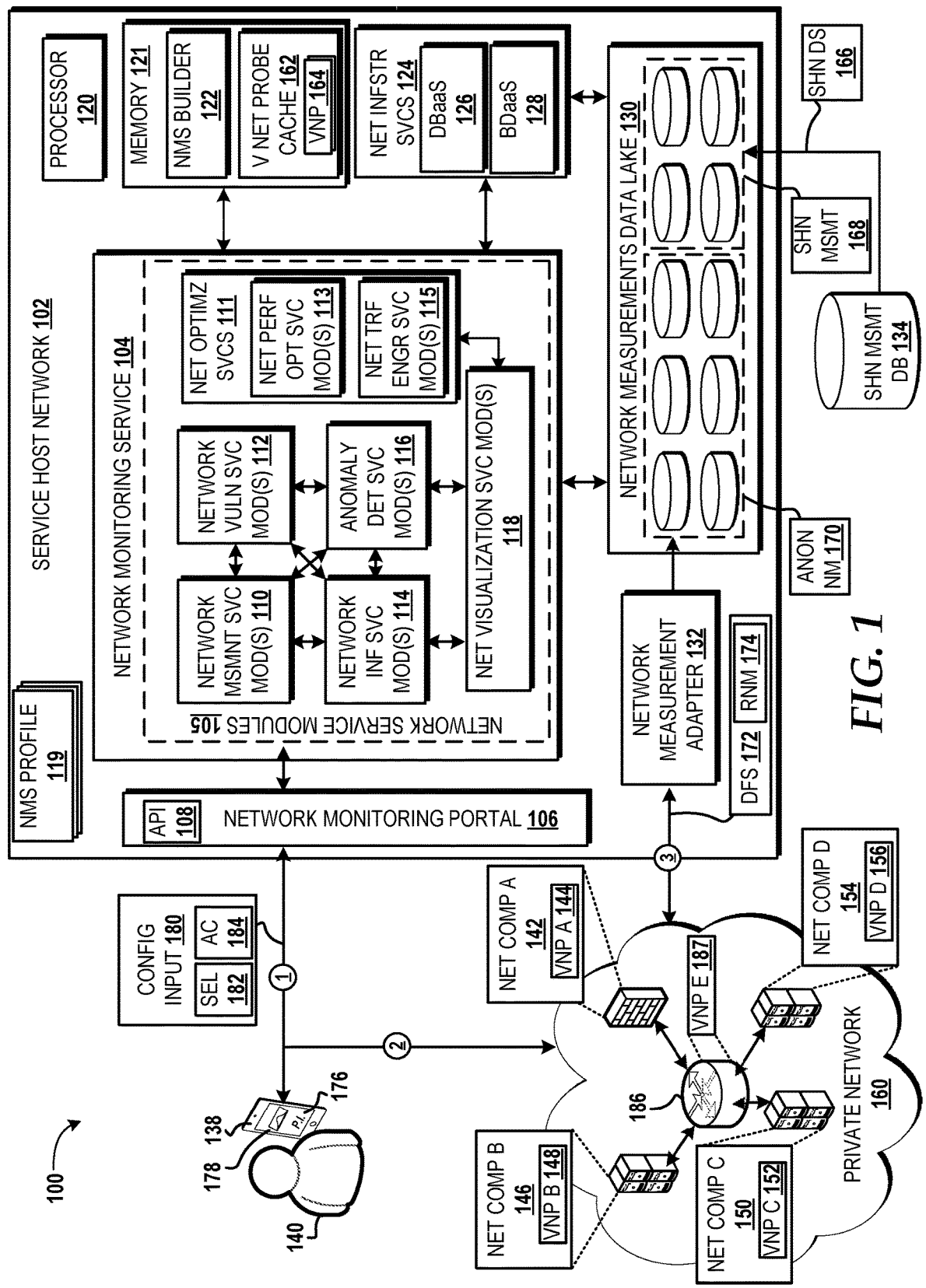
FIG. 1 is a system diagram showing an illustrative operating environment for various embodiments of the concepts and technologies described herein.

The following detailed description is directed to providing intelligent and integrated network monitoring as a service. Conventionally, network monitoring may have been implemented via installation of an isolated application on an employee's user equipment that connects to a private network. However, the isolated applications typically cannot handle the complexity of modern distributed networks, the highly dynamic availability of computing resources, the volume of network traffic relative to available bandwidth, and varied manufacturers of network components that facilitate communication within a private network. Aspects of the present disclosure provide a network architecture and infrastructure that can allow for effective network monitoring of the next generation networks, such as private cloud networks that rely on software defined networking and virtualized networks. Aspects of an intelligent and integrated network monitoring as a service can provide a cloud-based network monitoring framework which can integrate and virtualize network monitoring service modules for implementation within a user's private network. A service host network can provide a host framework that can integrate distributed computing hardware, software, a wide variety of network monitoring tools, models, and/or visualizations in order to provide fast, effective, scalable, reliable, and secure network monitoring services. In some embodiments, the service host network can be operated by a communication provider that offers the network monitoring service to customers, such as to users of a corporate enterprise using a private network or employees of the communication service provider that hosts the network monitoring service. In some embodiments, the network monitoring service can be provided as a feature included with a communication service subscription and/or as a stand-alone subscription. The network monitoring service can be configured to prompt actions by other processors, servers, network components, and/or user equipment of private networks that subscribe and/or otherwise have access to the network monitoring service. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for various embodiments of the concepts and technologies disclosed herein for providing virtual network monitoring as a service will be described, according to an illustrative embodiment. The operating environment 100 shown in FIG. 1 includes a user equipment (UE) 138 and a service host network ("SHN") 102 operating in communication with and/or as part of a private network 160. The operating environment 100 further includes a service host network measurement database (SHN DB) 134 that communicatively couples with the SHN 102. In some embodiments, the UE 138 is associated with a user 140 that can operate and/or otherwise manage the private network 160. In some embodiments, the SHN 102 can function as a communication service provider that provides communicative coupling to the internet and/or acts as a backbone that allows the private network 160 to span geographically diverse areas. In some embodiments, the SHN 102 can provide network services, such as a network monitoring service (NMS) 104, to the private network 160 and/or the UE 138. In some embodiments, the NMS 104 can be offered to the private network 160 and/or the UE 138 in a subscription model, where the user 140 can choose the functions and features to apply to the private network 160. In some embodiments, the NMS 104 can include virtual network monitoring because aspects of the NMS 104 can be to monitor and provide measurements of virtual resources within the private network 160, such as virtual processors and/or memory of one or more network components (e.g., a virtual network interface controller) that can facilitate network traffic within the private network 160. As such, in some embodiments, the NMS 104 can be considered to provide virtual network monitoring as a service.

According to various embodiments, the functionality of the user equipment 138 may be provided by one or more desktop computers, mobile communication devices (e.g., telephones, smartphones, tablet computers), laptop computers, smart wearables (e.g., smart watches, smart glasses, smart clothing, etc.), web browsers (e.g., browser-based implementations of communication devices), set-top boxes, vehicle computing systems, server computing systems, a combination thereof, or other particular, non-generic computing systems. It should be understood that the functionality of the UE 138 can be provided by a single device, by two or more similar devices, and/or by two or more dissimilar devices. For purposes of describing the concepts and technologies disclosed herein, the UE 138 is illustrated herein as a mobile communication device, however this may not necessarily be the case in all embodiments. It should be understood that this embodiment is illustrative, and should not be construed as being limiting in any way.

The UE 138 can execute an operating system and one or more application programs such as, for example, a web browser. The web browser can be an executable program configured to execute on top of the operating system to provide various functions for interacting with and/or using the NMS 104. For example, the SHN 102 can provide a network monitoring portal (NMP) 106 that can be accessed by the UE 138. In various embodiments, the NMP 106 can provide a dashboard that allows the user 140 to use the UE 138 to view, select, read, configure, and/or otherwise interact with the NMS 104. The NMP 106 can provide metrics and/or performance indicators (e.g., one or more visualizations 178 and one or more performance indicators 176) for presentation on the UE 138 so that the user 140 can understand how the private network 160 is functioning. In some embodiments, the UE 138 can use the web browser to navigate to the NMP 106 (e.g., via a uniform resource indicator) in order to interact with the NMS 104. In other embodiments, the NMP 106 can be a web application and/or a standalone application that uses an application programming interface (API) 108 to communicatively couple to the UE 138 via a communication path 1. Thus, it can be appreciated that the NMP 106 can execute instructions to provide the functionality illustrated and described herein. Because the NMP 106 can be accessed using various application programs and/or other applications that are generally understood (e.g., mail programs, messaging programs, web browsing programs, visualization programs, standalone applications, combinations thereof, or the like), the example embodiment shown in FIG. 1 should not be construed as limiting the concepts and technologies described herein in any way.

In some embodiments, the NMP 106 can use the API 108 to communicatively couple with the private network 160, such as via a communication path 2. As illustrated in FIG. 1, the communication path 2 is shown as linking with the communication path 1, however this may not necessarily always be the case. It is understood that the communication path 2 can include a separate link between the SHN 102 and the private network 160. In some embodiments, the UE 138 can communicatively couple to the private network 160 via the communication path 1 and/or the communication path 2. In some embodiments, the communication path 1 and/or the communication path 2 can include an access point (e.g., a base station, an (e)nodeB, a router, a switch, or other network node) that facilitates communication routing between and/or among one or more of the UE 138, the private network 160, and the SHN 102. It is understood that the examples shown and discussed herein are for illustration purposes only, and therefore should not be construed as limiting in any way.

The operating environment 100 can include a network that is external from the SHN 102, such as the private network 160. The private network 160 may be embodied as any number of various wired and/or wireless networks. The private network 160 can include a wired or wireless local area network, a wired or wireless wide area network, and/or a virtual private network that is hosted across one or more compute resources. The private network 160 can include any number of physical compute resources and physical memory resources, and/or virtualized compute and memory resources. As illustrated in FIG. 1, the private network 160 includes a plurality of network components (NC), such as an NC A 142, an NC B 146, an NC C 150, and an NC D 154. As used herein, the phrase "network component" refers to a network computing system that can be embodied on any particular, non-generic virtual and/or physical device and is configured to facilitate operation of the private network 160, such as communications within the private network 160 and with the UE 138 and the SHN 102. Although four instances of network components are illustrated, it is understood that zero, one, or more than one of each of the network components may exist within the private network 160. As such, the private network 160 is not limited to the four illustrated instances of network components. In some embodiments, each of the network components (e.g., the NC A 142, the NC B 146, the NC C 150, and the NC D 154) can perform a different function and/or serve a unique role within the private network 160. For example, in some embodiments, the NC A 142 can be configured to operate as a firewall, the NC B 146 can be configured to operate as a server computer system, the NC C 150 can be configured to operate as a data store, and the NC D 154 can be configured to operate as an authentication computer system. In some embodiments, the private network 160 can include a network hub 186 to communicatively couple the network components 142, 146, 150, and 154 to each other and/or the SHN 102 and/or the UE 138. Additional examples of network components can include, but should not be limited to, any of a border gateway protocol server, a network switch, a network router, a network hub, a provider edge device, a based station, a Node B, an eNodeB, an access point, a provider edge device, a server computer, a server farm, a firewall, a demilitarized zone computing system, a virtual server, a data store, a combination thereof, or any other non-generic, particular computing machine. It is understood that the examples shown and discussed are for illustration purposes only and should not be construed as limiting in any way. In some embodiments, the private network 160 can be configured to operate as a network 300, which is further discussed with respect to FIG. 3.

In various embodiments, the SHN 102 can include a computing system that includes a variety of processing resources and memory resources that support or otherwise facilitate the function and operations of the NMS 104. The SHN 102 can include a processor 120, a memory 121, a network measurement adapter (NMA) 132, the NMS 104, one or more instances of network infrastructure services (NIS) module 124, and a network measurements data lake (NM DL) 130. The processor 120 can be embodied as one or more types of processors capable of being configured upon execution in order to perform operations and functions discussed herein. For example, the processor 120 can include a single or multi-core processor, or other processor or processing device. The processor 120 can include one or more physical processors and/or virtual processors. The processor 120 can be configured to receive instructions and commands provided by any of the NMS 104, the NMP 106, the memory 121, the NM DL 130, the private network 160, and/or any other data stored within and/or provided to the processor 120. In some embodiments, the processor 120 can be configured to operate as a processing unit, such as the processing unit 402 that will be discussed with respect to FIG. 4.

The memory 121 can include any type of volatile and/or non-volatile memory capable of data storage. It is understood that the use of the term "memory" in the claims does not include waves or signals per se. The memory 121 is communicatively coupled to the processor 120 and any other elements of the SHN 102. As illustrated in FIG. 1, the memory 121 can store a network monitoring service builder application (NMS builder) 122 and a virtual network probe cache (VNP cache) 162. In some embodiments, the memory 121 can be configured as a distributed data storage system that can store and/or otherwise host instances of the NMS 104, the NMP 106, the NMA 132, the NM DL 130, the NMS builder 122, the VNP cache 162, the NIS module 124, and other data or network services accessible to the SHN 102.

The NMS builder 122 can be an application or other module of executable instructions that can be configured to interact with an application, program, service module of the NMS 104, or other software to enable management, control, assembly, and/or use of the NMS 104 and/or to interface with other applications (e.g., the NMP 106) to manage (or effect management of) the NMS 104. In the illustrated embodiment, the NMS builder 122 can be used to interact with the NMS 104 and define a configuration of the NMS 104 for monitoring of a particular network, such as the private network 160. The user 140 can use the NMP 106 to subscribe to the NMS 104 for monitoring of the private network 160. The user 140 can provide, via the UE 138 and the NMP 106, configuration input that can be used by the NMS builder 122 to create and define a network monitoring service profile (NMS profile) 119 associated with network monitoring of the private network 160. The NMP 106 can allow the user 140 to select which network monitoring services should be applied to the private network 160, such as through selection of one or more of a plurality of network service modules 105. In some embodiments, the network service modules 105 can be referred to as network monitoring service modules. As used herein, the phrase "module" refers to an instance of executable software, instructions, and/or commands that, upon execution, can provide operations and functions to support particular aspects of the network monitoring discussed herein. For example, in some embodiments, the network service modules 105 of the NMS 104 can include a network measurement service module 110, a network vulnerability service module 112, a network inference service module 114, an anomaly detection service module 116, and a network visualization service module 118. In some embodiments, the network service modules 105 can incorporate modules from network optimization services 111, such as a network performance optimization service module 113 and a network traffic engineering service module 115. For example, in some embodiments, the SHN 102 can provide network optimization services 111 that the user 140 can access and designate for use in optimizing the operations and functions of a network, such as the private network 160. As illustrated in FIG. 1, the network optimization services 111 is included within the NMS 104; however, this may not be the case in all embodiments. It is understood that, in some embodiments, the network optimization services 111 may be offered as a separate network service. In some embodiments, the network optimization services 111 can include the network performance optimization service module 113 that can execute and provide optimization parameters to improve the function, execution, and performance of a network (e.g., the private network 160) given the hardware, software, firmware and/or other configuration of that network. In some embodiments, the network optimization services 111 can include the network traffic engineering service module 115 that can execute and provide network configuration settings that can optimize the handling of network traffic based on the size of network traffic and other characteristics that are measured and/or determined for a network (e.g., the private network 160) by the network service modules 105. The NMS builder 122 can allow the user 140 to assemble a customized combination of network monitoring services through selection of the plurality of network service modules 105 via the use of the NMP 106. In some embodiments, a user, such as the user 140, can create their own network monitoring service module via the NMS builder 122, and also implement the user created network monitoring service module within the private network they choose to have monitored, such as the private network 160. The NMS builder 122 can record, within the NMS profile 119 associated with the private network 160 and the user 140, the selection from the plurality of network service modules 105.

For example, the user 140 can use the UE 138 to access the NMP 106. The NMS builder 122 can instruct the NMP 106 to present the network service modules 105 as options available for inclusion as part of the NMS 104. The user 140 can identify the type of network monitoring services that should be used for the private network 160 by using the UE 138 to provide a configuration input message 180. The configuration input message 180 can include a selection 182 indicating one or more of the plurality of network service modules 105 that should be used for monitoring the private network 160. In an embodiment, the selection 182 can indicate that at least the network vulnerability service module 112, the anomaly detection service module 116, and the network inference service module 114 should be used for monitoring the private network 160. In various embodiments, the NMS builder 122 can automatically include the use of the network measurement service module 110 and the network visualization service module 118 in the NMS 104. The NMS builder 122 can record the selection 182 in the NMS profile 119. In some embodiments, the configuration input message 180 also can include access credentials 184 associated with the private network 160. The access credentials 184 can include, but should not be limited to, a user name, a password, a token, a key, a security certificate, network address information (e.g., an IP address associated with the network hub 186 for accessing the private network 160), or the like. It is understood that, in some embodiments, the user 140 can be located within and/or otherwise associated with the private network 160 such that the access credentials 184 can be used by the user 140 to access services of the NMS 104 via the NMP 106. In some embodiments, the access credentials 184 can be used by the NMS builder 122 to gain and maintain access to the private network 160 for network monitoring by the network service modules 105.

In some embodiments, each of the network service modules 105 can communicate with each other and with other entities (e.g., the NM DL 130, the NIS module 124, the NMP 106, the private network 160, etc.) using an application programming interface (API). In some embodiments, the API used by a particular one of the network service modules 105 is configured as a representational state transfer API (RESTful API). In some embodiments, the network service modules 105 use a messaging queue system to communicate with the private network 160 and/or within the SHN 102.

In some embodiments, the network measurement service module 110 can identify the type of measurements that should be obtained from the private network 160 so that key performance indicators can be determined where passive and active network monitoring components are located, which of the network components 142, 146, 150, 154 and/or 186 in the private network 160 should be monitored for the measurements, and how often the measurements should occur. It is understood that a private network, such as the private network 160, can include a network in which the network components (including hardware, software, and/or firmware components) may or may not be owned and/or otherwise associated with the service provider of the SHN 102. Network measurements can occur using a virtual network probe (VNP), such as one of a plurality of VNPs 164 stored in the VNP cache 162. A "VNP" includes a defined block of executable instructions that can be configured by the NMS builder 122 to collect and report network measurements, and be injected into a designated location within the private network 160 such that monitoring of network traffic to, from, and/or within a particular network component (e.g., any of the NC A 142, the NC B 146, the NC C 152, the NC D 154, and the hub 186) of the private network 160 can occur. In some embodiments, a VNP can denote a network measurement component and/or agent that can execute on behalf of the SHN 102 within a network (e.g., the private network 160). In some embodiments, each of the plurality of VNPs 164 can collect and report network measurements (a) periodically, where the time and/or frequency with which the network measurements are reported can be defined by the NMS builder 122. In some embodiments, the type of measurements obtained by the particular VNP and/or placement of the particular VNP can be based on which of the network service modules 105 are selected by the user 140 for inclusion in a subscription to the NMS 104, such as indicated by the selection 182.

Examples of network measurements can include a network flow measurement (e.g., by configuring a VNP to use a simple network management protocol to obtain a measure indicating a communication link load), a network throughput measurement (e.g., by configuring a VNP to use a transmission control protocol to test for throughput of a payload across a network interface of the private network 160), a network delay measurement (e.g., by configuring a VNP to use a user datagram protocol and a specified datagram size and timestamps to indicate a delay in network traffic), a network packet loss measurement (e.g., by configuring a VNP to use a user datagram protocol to measure packet loss for a specified datagram size), a connection attempt measurement (e.g., by configuring VNP to measure the number of times a request from a specific IP is denied and the time span between connection attempts), or other measurements that can collect and report network traffic communications associated with a monitored network (e.g., the private network 160). In some embodiments, a VNP (e.g., one of the VNP A 144, the VNP B 148, the VNP C 152, the VNP D 156, and the VNP E 187) can be configured to enable dynamic monitoring or static monitoring as part of the NMS 104. For example, if the NMS builder 122 configures a VNP (e.g., the VNP C 152) to provide static monitoring, then the VNP C 152 may be assigned to a monitor only a specific type of network measurement at a particular location of the private network 160 and report the measurement at a fixed time, such as monitoring only a network flow measurement for a single port of a virtual network interface controller of the NC C 150 and reporting every 24 hours. Comparatively, when a VNP (e.g., the VNP A 144) is configured to provide dynamic monitoring, then the VNP can support monitoring of a variety of network measurements at a location relevant to the network traffic corresponding to the network measurement and reporting the network measurements when network traffic is below average, thereby ensuring that the VNP does not cause the network component to stall. It is understood that dynamic monitoring also can include a scenario in which the location of monitored network components, the location of VNPs, and the type and specification of network measurements can adaptively change over time and/or as specified by the user. For example, the VNP A 144 can be injected at the NC A 142 to monitor traffic of the private network 160 and provide a network flow measurement, a network throughput measurement, and a connection attempt measurement that can be used in determination of network vulnerability and anomalies.

In some embodiments, when the user 140 selects the network services that should apply to the private network 160 (e.g., the selection 182 indicating a network vulnerability service, a network inference service, and an anomaly detection service), the NMS builder 122 can identify the network service modules 105 corresponding to the selection, such as the network vulnerability service module 112, the network inference service module 114, and the anomaly detection service module 116. The NMS builder 122 can also automatically include use of the network measurement service module 110 and the network visualization service module 118 during use of the NMS 104. The NMS builder 122 can access the VNP cache 162 to instantiate one or more VNPs 164 that will be assigned to the private network 160 for network monitoring. In some embodiments, the NMS builder 122 can store, within the NMS profile 119, VNP identifiers that provide identifying information of the one or more VNPs 164 that will be used to provide monitoring of the private network 160. For example, using the selection 182, the NMS builder 122 can instantiate the VNP A 144, the VNP B 148, the VNP C 152, the VNP D 156, and the VNP E 187 for use in monitoring the private network 160. In some embodiments, the VNPs 164 may include scripts that have been compiled into an intermediate form that is ready to be used to instantiate virtual network probes that will be used in the monitored network (e.g., the private network 160). For example, in some embodiments, the NMS builder 122 can instantiate the VNPs 144, 148, 152, 156, and 187 by translating five of the VNPs 164 into instances of machine code that each correspond with a VNP identifier. The VNP identifiers for the respective VNPs 144, 148, 152, 156, and 187 can be stored in the NMS profile 119.

Once the VNPs 144, 148, 152, 156, and 187 are instantiated, the NMS builder 122 can inject the VNPs 144, 148, 152, 156, and 187 into the private network 160. In some embodiments, the configuration input message 180 can include access credentials 184. In some embodiments, the access credentials 184 can be used by the NMS builder 122 to gain access to the private network 160. For example, the access credentials 184 can provide an API key that the NMS builder 122 can present to an edge device of the private network 160 in order to gain access to the network components 142, 146, 150, and 154. In some embodiments, the UE 138 can obtain the access credentials 184 via input from the user 140 and/or from the private network 160. Once access to the private network 160 has been granted, the NMS builder 122 can inject the VNPs 144, 148, 152, 156, and 187 by injecting the VNP 187 into the network hub 186 and providing the network hub 186 with the VNPs 144, 148, 152, and 156 to distribute to the NC's 142, 146, 150, and 154, respectively. The NMS builder 122 may use the selection 182 from the configuration input message 180 to identify the network components that should be monitored (e.g., the NCs 142, 146, 150, and 154), and instruct the network hub 186 to route the VNPs 144, 148, 152, and 156 to the respective network components that will be monitored. For example, in some embodiments, the NMS builder 122 can inject the VNPs 144, 148, 152, and 156 into the private network 160 such that the VNP A 144 is assigned to monitor the NC A 142, the VNP B 148 is assigned to monitor the NC B 146, the VNP C 152 is assigned to monitor the NC C 150, and the VNP D 156 is assigned to monitor the NC D 154. The VNPs 144, 148, 152, and 156 can be configured to activate (i.e., begin monitoring and collecting measurements) in response to being injected within the private network 160.

The VNPs 144, 148, 152, and 156 can be configured to collect network measurements and send the network measurements to the NMA 132 of the SHN 102. In some embodiments, the network measurements are sent to the NMA 132 as a data file stream 172. In some embodiments, the data file stream 172 can be sent to the NMA 132 at specific times, such as times when the network traffic is less congested than average in order to avoid stalling the private network 160. In some embodiments, the network measurements collected by the VNPs 144, 148, 152, and 156 can be included in the data file stream 172 as raw network measurements, such as the raw network measurements 174. The raw network measurements 174 can be referred to as "raw" because the network measurements would not have been processed and may contain information that identifies the network components that were being measured (e.g., the manufacturer of the network component, the hardware, software, and/or firmware of the network component, and/or the network address within the private network 160). In some embodiments, raw network measurements 174 can include VNP identifiers corresponding to the respective VNPs 144, 148, 152, and 156.

The NMA 132 can receive, via a communication path 3, the data file stream 172 from the private network 160. In some embodiments, the NMA 132 can be configured as a network edge device that can receive the data file stream 172 and relay the data file stream 172 to the NM DL 130. In some embodiment, the NMA 132 can anonymize the raw network measurements 174 from the data file stream 172 in order to create the anonymized network measurements 170. To anonymize the raw network measurements 174 and create the anonymized network measurements 170, the NMA 132 can remove information that identifies user information associated with the NMS profile associated with the network being monitored and/or the specific network components that obtained the measurements (e.g., customer identity operating the private network 160 and associated with the NMS profile 119, a user identity, a network nickname that connects the network components of the private network 160, or the like). In some embodiments, the anonymized network measurements 170 and/or the data file stream 172 can retain VNP identifiers corresponding to the respective VNPs that provided the raw network measurements 174. Stated differently, the process of anonymizing the raw network measurements 174 can remove information that could identify a particular user and/or identity of a network that subscribes to the NMS 104 while retaining VNP identifiers associated with the VNPs that collected the measurements. This can allow the network service modules 105 to analyze the raw network measurements 174 and/or the anonymized network measurements 170 without revealing the identity of a customer associated with the network that was measured. Although the anonymized network measurements 170 can appear anonymized to at least one of the network service modules 105, in an embodiment, the NMS builder 122 can inform the network visualization service module 118 of the NMS profile 119 in order to allow the UE 138 to view visualizations and performance indicators developed based on the analysis of at least the raw network measurements 174 and/or the anonymized network measurements 170.

In some embodiments, the anonymized network measurements 170 can be stored in the NM DL 130 for use in providing analysis for the private network 160 associated with the NMS profile 119 and/or for use in supplementing analysis of other networks that subscribe to monitoring via the NMS 104. In some embodiments, the NM DL 130 also can include service host network measurements 168. The service host network measurements 168 can include network measurements and/or data that is associated with one and/or multiple data sources corresponding to the SHN 102. For example, the SHN 102 may include a wired network (e.g., a public switched telephone network, a circuit switched network, a local area network, or the like) and/or a wireless network (e.g., a wireless wide area network, an evolved packet core network, a multiprotocol label switching internet protocol network, or the like) to provide communication services to customers. In some embodiments, the SHN 102 is communicatively coupled to an SHN measurement database, such as the SHN measurement database 134, that can provide the SHN measurements 168 to the NM DL 130. The SHN measurement database 134 can provide the SHN measurements 168 to the NM DL 130 via an SHN data stream 166. In some embodiments, the SHN measurements 168 can supplement and/or complement the anonymized network measurements 170 by providing a threshold, a benchmark, a baseline, a trend, a pattern, an indication, and/or other external information that can be used by the network service modules 105 to compare, assess, evaluate, examine, or otherwise analyze the anonymized network measurements 170. In some embodiments, the SHN measurements 168 can correspond with other customers and/or networks that subscribe to the NMS 104. The SHN measurements 168 may not have been taken from the private network 160, but rather can include measurements from network activity within the SHN 102 and/or other networks that are communicatively coupled to the SHN 102. In some embodiments, the identity of the customer and/or network associated with the SHN measurements 168 can be obscured and/or otherwise hidden from the network service modules 105 so as to allow for analysis of the raw network measurements 174 and/or the anonymized network measurements 170 without compromising privacy policies of the SHN 102.

In some embodiments, once the anonymized network measurements 170 are received by the NM DL 130, at least a portion of the anonymized network measurements 170 can be forwarded to one or more of the network service modules 105 of the NMS 104. In some embodiments, portions of the anonymized network measurements 170 can be routed to a particular one of the network service modules 105 based on a VNP identifier residing in the anonymized network measurements 170 that also corresponds with one of the network service modules 105. For example, the anonymized network measurements 170 can include a VNP identifier associated with the VNP A 144, and the VNP A 144 can be configured to provide measurements for the network vulnerability service module 112 and the anomaly detection service module 116. In some embodiments, the anonymized network measurements 170 are received by each of the network service modules 105, such as the network measurement service module 110, the network vulnerability service module 112, the network inference service module 114, and the anomaly detection service module 116.

The network inference service module 114 can use the anonymized network measurements 170 and/or the imported SHN measurements 168 to estimate a set of parameter indicators that are of interest to the user 140. For example, the network inference service module 114 can receive the anonymized network measurements 170 that contain a network flow measurement and a network delay measurement. The network inference service module 114 can use the network flow measurement and the network delay measurement to estimate a network traffic flow-size. In some embodiments, the services provided by the NMS 104 of the SHN 102 can be extended to include network optimization. For example, a control plane of the private network 160 can be identified and optimized in the SHN 102 via the NMS 104. For instance, if the private network has a set of routers as network components, then the network service modules 105 can provide routing table to the private network 160. In another example, if the private network 160 includes a set of eNodeB's as network components, then the network service modules 105 can provide optimization parameters to the private network 160. In some embodiments, the optimization parameters can be provided by one or more of the network performance optimization service module 113 and/or the network traffic engineering service module 115. In some embodiments, the network inference service module 114 can use a link load vector from the anonymized network measurements 170 and a routing matrix to estimate a size of network traffic flow corresponding to the private network 160. In some embodiments, network inference service module 114 also can estimate flow delays and packet loss-rates based on the anonymized network measurements 170. In some embodiments, the optimization parameters provided by the network performance optimization service module 113 and/or the network traffic engineering service module 115 can be based on the flow delays, packet loss-rates, and/or the size of network traffic flow that was determined using one or more of the network service modules 105. In some embodiments, the SHN measurements 168 can be used by the network inference service module 114 to supplement the raw network measurements 174 and/or the anonymized network measurements 170 in order to fill in gaps in data when, for instance, one of the VNPs was not taking a measurement.

In some embodiments, the raw network measurements 174 and/or the anonymized network measurements 170 can be used by the anomaly detection service module 116 to determine performance indicators about the private network 160. The anomaly detection service module 116 can be configured to provide a set of models, tools, and/or processes to identify a network security threat and/or a misbehavior of a network component due to operation failure, network congestion, and/or other deviations in the performance of the private network 160. For example, the anomaly detection service module 116 can analyze the anonymized network measurements 170 and/or the raw network measurements 174 of the data file stream 172 and determine that the NC C 150 repeatedly restarts a processing thread when communications within the private network 160 exceed a baseline of average traffic volume. In some embodiments, the anomaly detection service module 116 can supplement the analysis with the SHN measurements 168 to determine whether repeated restarts are common and/or expected when other devices handle network traffic above the average traffic volume. In some embodiments, the anomaly detection service module 116 can determine that repeated restarts may be expected, however, an entry in an error log is also expected to be created. The anomaly detection service module 116 can use the raw network measurements 174 and/or the anonymized network measurements 170 to determine that the NC C 150 is not recording the repeated restarts as an error in an error log, and thus the restarts of the processing thread may have not been recognized by the private network 160. However, the anomaly detection service module 116 can determine that the repeated restarts of the processing thread of NC C 150 constitute an anomaly, thereby causing the anomaly detection service module 116 to create a performance indicator 176 that can alert and/or otherwise inform the user 140 of the presence of the anomaly with the NC C 150.

The network monitoring service 104 also can include use of the network vulnerability service module 112. The network vulnerability service module 112 can complement the anomaly detection service module 116 by enabling the network monitoring service 104 to prevent and monitor for unauthorized access, misuse, modification, and/or denial of access to a computer network (e.g., the private network) and/or network-accessible resources (e.g., the NC A 142, the NC B 146, the NC C 150, and the NC D 154). For example, the network vulnerability service module 112 can use a connection attempt measurement from the raw network measurements 174 and/or the anonymized network measurements 170 to detect whether the private network 160 has been subject to a denial of service attack (DOS attack) and/or a distributed denial of service attack (DDOS attack). In some embodiments, the anomaly detection service module 116 can inform the network vulnerability service module 112 of an anomaly regarding the amount of connection attempts to connect to the private network 160 from an IP address external to the private network 160. The network vulnerability service module 112 can determine that the anomaly indicating repeated connection attempts corresponds with a port at the NC A 142 that is configured as a firewall. In some embodiments, the network vulnerability service module 112 can incorporate the use of the network infrastructure service module 124, such as a big data as a service module 128 and/or a database as a service module 126. The database as a service module 126 can store measurements from the SHN measurement database 134 and/or from other customers and/or networks that are not associated with the private network 160. The big data as a service module 128 can be used to supplement the analysis of the network service modules 105 by performing analysis on the data and measurements from other customers of the NMS 104 without allowing the network vulnerability service module 112 to access the underlying measurements associated with the other customers and/or networks (i.e., customers and/or networks not associated with the private network 160). For example, the big data as a service module 128 can provide analysis of the SUN measurements 168 to confirm whether any other DOS attack and/or DDOS attack occurred within the SHN 102 at the same time and/or same date as the anomaly detected in the private network 160. In some embodiments, data and measurements obtained through the network infrastructure service module 124 can allow for multi-dimensional data analysis (e.g., analysis over time, analysis using multiple network paths, and analysis of various network types) without compromising privacy of the data and measurements associated with other customers and/or networks that use the SHN 102. In an embodiment, the big data as a service module 128 can shield identifying attributes of the SHN measurements 168 (e.g., other customer identifiers associated with data corresponding to the SHN measurements 168) while allowing the network service modules 105 to use the data during analysis.

The NMS 104 also can include the network visualization service module 118. The network visualization service module 118 can provide visualization tools and user interfaces to create visualizations (e.g., user interfaces, graphs, charts, menus, graphics, images, or the like) based on the analysis from any of the network vulnerability service module 112, the network measurement service module 110, the network inference service module 114, the anomaly detection service module 116, the network infrastructure service module 124, or other network services of the SHN 102. The network visualization service module 118 can be used to display performance indicators that correspond with determinations computed by the network service modules 105, such as performance indicators that identify network processing failures, network anomalies, network attacks, processing and/or memory resource performance alarms, network security alarms, and other aspects of network performance that can be visualized and provided to the UE 138 associated with the private network 160 that subscribes to the NMS 104. In some embodiments, the network visualization service module 118 can create a visualization, such as the visualization 178, that can be presented on a display of the UE 138. The visualization 178 can be based on one or more of the performance indicators listed above. For example, in some embodiments, the visualization 178 can present a performance indicator, such as the performance indicator 176. The performance indicator 176 can be any of the performance indicators listed above, such as an indication of the number of network anomalies detected. In some embodiments, the network visualization service module 118 can configure the performance indicator 176 to be interactive in order to allow the user 140 to compare the performance indicator 176 with analytics of other customers and their corresponding networks that also subscribe to the NMS 104. By this, the performance indicator 176 can be provided in a user interface that can be customized and/or configured with information desired by the user 140. In some embodiments, the visualization 178 and/or the performance indicator 176 can be presented to the user 140 via the NMP 106. In some embodiments, the visualization 178 can identify the locations of the VNPs 144, 148, 152, and 156 within the private network 160 that are monitoring and providing the raw network measurements 174 to the network service modules 105. In some embodiments, the user 140 can provide input to request that at least one additional VNP be added to the private network 160 to provide monitoring and measurement. The NMS builder 122 can instantiate another VNP from the VNPs 164 of the VNP cache 162 and inject the additional VNP at a location that corresponds with the input from the user 140. In some embodiments, two or more private networks (e.g., two or more instances of the private network 160) can be monitored by the NMS 104 of the SHN 102. The measurements coming from the two or more monitored private networks can be anonymized based on an agreement between the monitored SHN 102 and the parties whose data is being used in the analysis. It is understood that the examples provided are for illustration purposes only, and therefore should not be construed as limiting in any way.

FIG. 1 illustrates one user equipment 138, one SHN 102, one user 140, three communication paths (e.g., the communication paths 1, 2, and 3), one private network 160, four network components (e.g., the NC A 142, the NC B 146, the NC C 150, and the NC D 154), one SHN measurement database 134, one NMP 106, one NMS profile 119, one NMS 104, one network optimization service 111, one processor 120, one memory 121, one NMS builder 122, one VNP cache 162, one VNP 164, one NIS module 124, one data base as a service module 126, one big data as a service module 128, one NMA 132, one NM DL 130, and seven network service modules 105 (e.g., the network measurement service module 110, the network vulnerability service module 112, the anomaly detection service module 116, the network inference service module 114, the network visualization service module 118, the network performance optimization service module 113, and the network traffic engineering service module 115). It should be understood, however, that various implementations of the operating environment 100 can include zero, one, or more than one user equipment 138; zero, one, or more than one SHN 102; zero, one, or more than one user 140; zero, one, or more than one communication paths; zero, one, or more than one private network 160; zero, one, or more than one network components; zero, one, or more than one SHN measurement database 134; zero, one, or more than one NMP 106; zero, one, or more than one NMS profile 119; zero, one, or more than one NMS 104; zero, one, or more than one network optimization service 111, zero, one, or more than one processor 120; zero, one, or more than one memory 121; zero, one, or more than one NMS builder 122; zero, one, or more than one VNP cache 162; zero, one, or more than one VNP 164; zero, one, or more than one NIS module 124; zero, one, or more than one data base as a service module 126; zero, one, or more than one big data as a service module 128; zero, one, or more than one NMA 132; zero, one, or more than one NM DL 130; and zero, one, or more than one network service modules 105. As such, the illustrated embodiment should be understood as being illustrative, and should not be construed as being limiting in any way.

Figure 2:
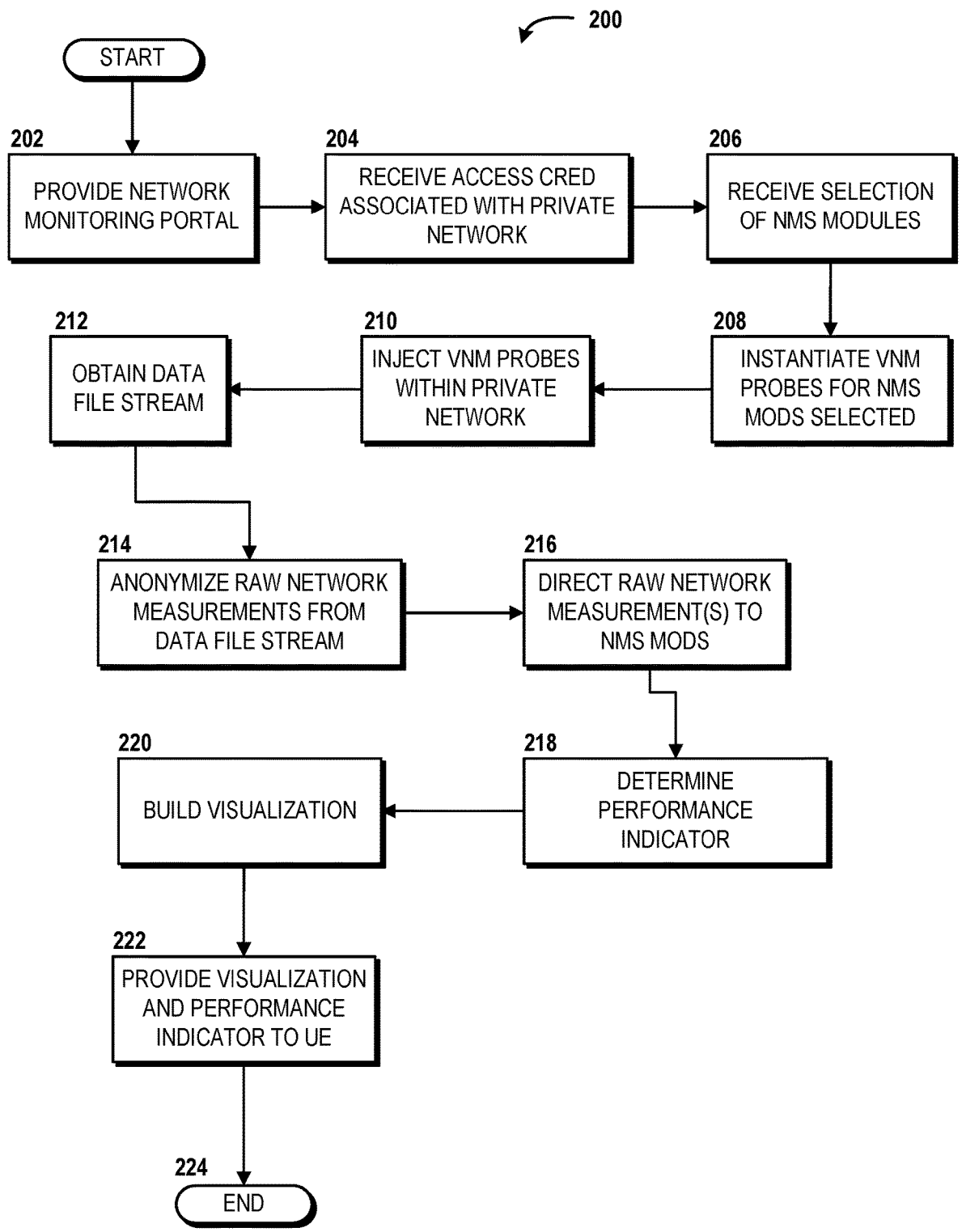
FIG. 2 is a flow diagram showing aspects of a method for providing network monitoring as a service, according to an illustrative embodiment of the concepts and technologies described herein.

Turning now to FIG. 2, aspects of a method 200 for intelligent and integrated network monitoring as a service will be described in detail, according to an illustrative embodiment. It should be understood that the operations of the method disclosed herein (e.g., the method 200) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, a service host network, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as a computer system providing the NMS 104 and/or the SHN 102, to perform one or more operations and/or causing the processor to direct other components of the computing system or device to perform one or more of the operations.

For purposes of illustrating and describing the concepts of the present disclosure, the methods disclosed herein are described as being performed by a computer system of the SHN 102 via execution of one or more software modules such as, for example, the NMS builder 122 that configure one or more processors, such as the processor 120. It should be understood that additional and/or alternative devices and/or network nodes can, in some embodiments, provide the functionality described herein via execution of one or more modules, applications, and/or other software including, but not limited to, the network service modules 105 executing the NMS 104. Thus, the illustrated embodiments are illustrative, and should not be viewed as being limiting in any way.

The method 200 begins at operation 202, where the processor 120 within the SHN 102 can execute the NMS builder 122 to provide a network monitoring portal to a user equipment associated with a private network, such as the NMP 106 to the UE 138 that is associated with the private network 160. For example, the user 140 can use the UE 138 to launch and/or navigate to the NMP 106. The NMP 106 can allow the user 140 to enter data and/or information about the private network 160 and subscribe to a network monitoring service, such as the NMS 104. The NMP 106 can be used to establish a network monitoring service profile for a private network, such as the NMS profile 119 for the private network 160. From operation 202, the method 200 can proceed to operation 204 where the NMS builder 122 can receive, from the UE 139 via the NMP 106, input from the user 140. For example, the input can include the configuration input message 180 that includes the access credentials 184. The access credentials 184 can enable the NMS 104 to gain and maintain access to the private network 160.

From operation 204, the method 200 can proceed to operation 206 where the NMS builder 122, via the NMP 106, can receive a selection of a plurality of network monitoring service modules, such as at least one of the network service modules 105, for monitoring the private network 160. For example, the configuration input message 180 can include the selection 182 that identifies network monitoring services corresponding to network monitoring service modules. The network monitoring services selected by user 140 can correspond with a plurality of network service modules that can include any of the network measurement service module 110, the network vulnerability service module 112, the network inference service module 114, the anomaly detection service module 116, the network visualization service module 118, the network performance optimization service module 113, and the network traffic engineering service module 115. In some embodiments, the NMS builder 122 can also use network infrastructure services to supplement the NMS 104, such as by executing the network infrastructure service module 124. In some embodiments, the user 140 may not have to explicitly select one of the network infrastructure services (e.g., a database service provided by the data base as a service module 126 and/or a big data service provided by the big data as a service module 128) in order for the network infrastructure services to be used in the NMS 104. In some embodiments, the NMS builder 122 can include use of the network infrastructure services to supplement the analysis provided by the network service modules 105. It is understood that the examples provided are for illustration purposes only, and therefore should not be construed as limiting in any way.

From operation 206, the method 200 can proceed to operation 208 where the NMS builder 122 can instantiate at least one virtual network monitoring probe that corresponds to a network monitoring service module that is selected. For example, the VNP A 144, the VNP B 148, the VNP C 152, and the VNP D 156 can be instantiated by the NMS builder 122 based on the selection 182. It is understood that the number of VNPs instantiated and/or used in monitoring the private network 160 may not be a one-to-one relationship with the number of network monitoring service modules selected. For example, the selection 182 may indicate that network vulnerability service module 112 should be used to monitor the private network 160. The configuration input message 180 may indicate that multiple network components should be checked for vulnerabilities. Using the selection 182 and the configuration input message 180, the NMS builder 122 can instantiate a plurality of virtual network monitoring probes to provide monitoring and measurements that will be analyzed by the network service modules 105.

From operation 208, the method 200 can proceed to operation 210 where the NMS builder 122 can use the access credentials 184 to inject the plurality of virtual network monitoring probes (e.g., VNP A 144, the VNP B 148, the VNP C 152, and the VNP D 156) within the private network 160. In some embodiments, the access credentials 184 can allow the virtual network monitoring probes to be injected via the API 108 of the SHN 102. In some embodiments, the access credentials 184 may also contain network addresses within the private network 160 that indicate where the virtual network monitoring probes should be injected. In other embodiments, the NMS builder 122 may be permitted access to review the network architecture and identities of the network components of the private network 160, and may inject the virtual network monitoring probes based on the review. In some embodiments, the term "injecting" refers to providing the private network 160 with the virtual network monitoring probes and ensuring that the virtual network monitoring probes are allocated (at least temporarily) memory and processing resources to monitor the private network 160. In some embodiments, the virtual network monitoring probes are activated in response to being injected within the private network 160. As used herein, activation of the virtual network monitoring probes refers to the virtual network monitoring probes being instructed to execute within the private network 160 and monitor the private network 160 continuously and/or at set intervals. In some embodiments, the virtual network monitoring probes (e.g., VNP A 144, the VNP B 148, the VNP C 152, and the VNP D 156) can be configured to send the data file stream 172 to the NMA 132 of the SHN 102. For example, the virtual network monitoring probes (e.g., VNP A 144, the VNP B 148, the VNP C 152, and the VNP D 156) can monitor the network components and obtain measurements based on the network traffic and operations of the network components within the private network 160. In some embodiments, one of the virtual network monitoring probes can assemble the data file stream 172 by collecting measurements from at least one (or each) of the virtual network monitoring probes in the private network 160 (e.g., the VNP D 156 collecting measurements from the VNP A 144, the VNP B 148, the VNP C 152 to form the raw network measurements 174 that can be included in the data file stream 172) and can send the data file stream 172 to the NMA 132.

From operation 210, the method 200 can proceed to operation 212, where the NMA 132 obtains the data file stream 172 that includes the raw network measurements 174. In some embodiments, the data file stream 172 can identify the virtual network monitoring probes that were used to monitor and collect the raw network measurements 174. From operation 212, the method 200 can proceed to operation 214, where the NMA 132 can anonymize the raw network measurements 174 from the data file stream 172. In some embodiments, the NMA 132 anonymizes the raw network measurements 174 by removing, obscuring, shielding, or otherwise sanitizing the raw network measurements 174 of information that could reveal an identity of a user associated with the network being monitored. In some embodiments, the anonymized network measurements 170 and/or the data file stream 172 can retain VNP identifiers corresponding to the respective VNPs that provided the raw network measurements 174.

From operation 214, the method 200 can proceed to operation 216, where the NMS builder 122 can direct the raw network measurements 174 and/or the anonymized network measurements 170 to at least one of the network service modules 105. In some embodiments, directing the measurements from the private network 160 can be in response to anonymizing the raw network measurements 174. In some embodiments, the network measurement data lake 130 can concatenate the raw network measurements 174 and/or the anonymized network measurements 170 with the service host network data stream 166 (and/or with historical data already in the NM data lake 130) prior to directing the measurements to at least one of the plurality of network service modules 105. The service host network data stream 166 can include the service host network measurements 168 that can supplement the raw network measurements 174 and/or the anonymized network measurements 170. In some embodiments, the SHN measurements 168 and/or the NM DL 130 can include historical data from other users or customers of the SHN 102, other private networks not associated with the private network 160, and/or historical data from the private network 160. As used herein, the term data lake (e.g., the NM data lake 130) refers to a storage repository of the SHN 102 that can hold or otherwise store raw data in its native formal unit it is needed, such as by one or more of the network service modules 105, and can store data in a flat architecture (as opposed to a hierarchical data warehouse that relies on files or folders).

From operation 216, the method 200 can proceed to operation 218, where at least one of the network service modules 105 can execute to determine a performance indicator, such as an indicator of network processing failures, network anomalies, network attacks, processing and/or memory resource performance alarms, network security alarms, and other aspects of network performance that can be visualized and provided to the UE 138 associated with the private network 160 that subscribes to the NMS 104. From operation 218, the method 200 can proceed to operation 220, where the network visualization service module 118 can build a visualization, such as the visualization 178, based on a performance indicator, such as the performance indicator 176. From operation 220, the method 200 can proceed to operation 222 where the NMS 104 can provide, via the NMP 106, the visualization 178 and the performance indicator 176 to the UE 138. It should be understood that this example is illustrative and therefore should not be construed as being limiting in any way. From operation 222, the method 200 proceeds to operation 224, where the method 200 ends.

Figure 3:
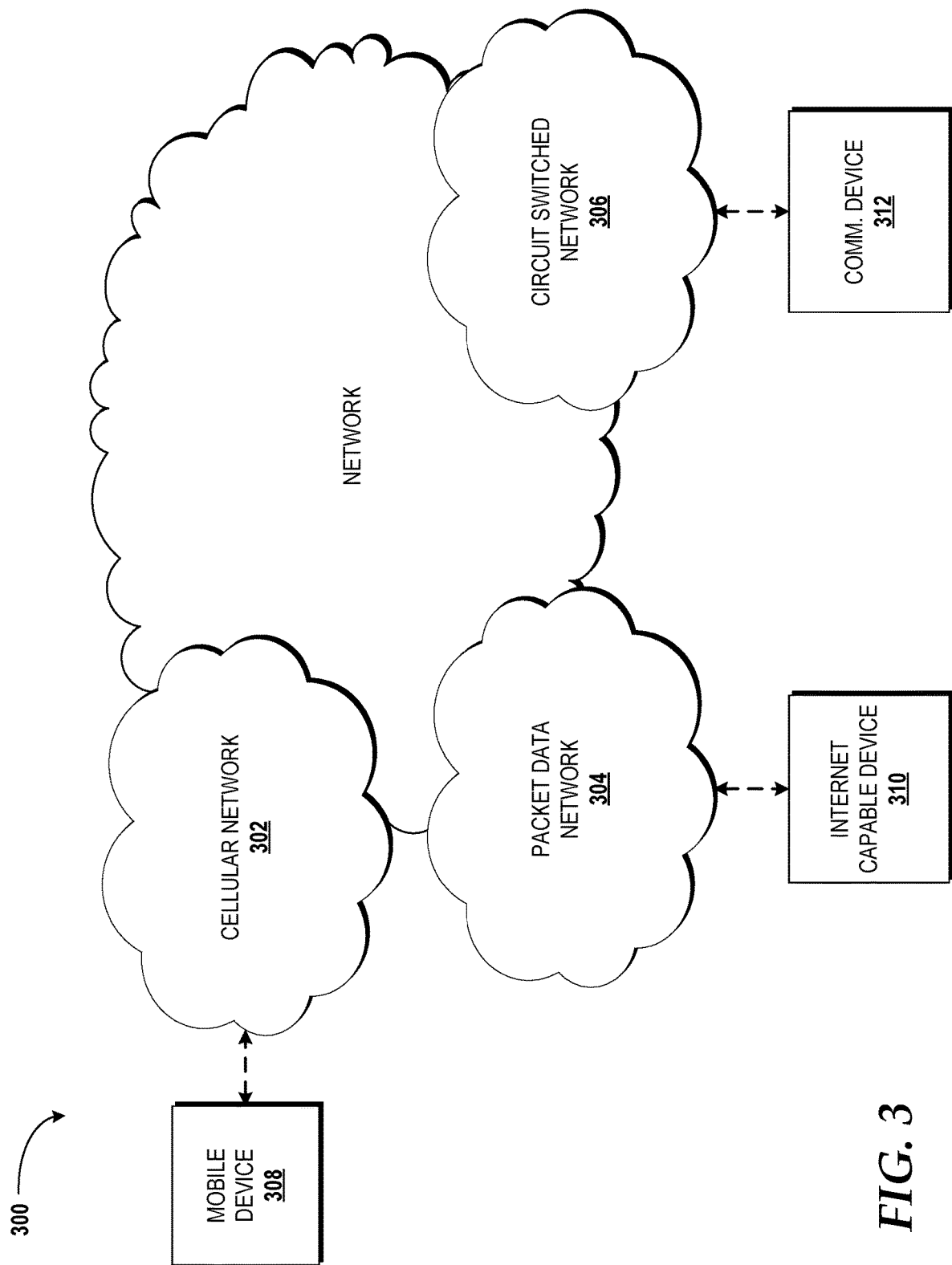
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 300 can include the private network 160 and/or the SHN 102. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, a cellular telephone, a user equipment (e.g., the UE 138), a mobile terminal, a PDA, a laptop computer, a handheld computer, and combinations thereof, can be operatively connected to the cellular network 302. In some embodiments, the UE 138 can be configured as the mobile communication device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, such as LTE-U.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the private network 160 and/or the SHN 102 can be configured as a packet data network, such as the packet data network 304. The circuit switched network 306 includes various hardware and software for providing circuit switched communications. The circuit switched network 306 may include, or may be, what is often referred to as a POTS. In some embodiments, the network 160 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the private network 160 and/or the SHN 102 can be performed by the cellular network 302, the packet data network 304, and/or the circuit switched network 306, alone or in combination with other networks, network elements, and the like, according at least to aspects of the features and operations discussed herein.

Figure 4:
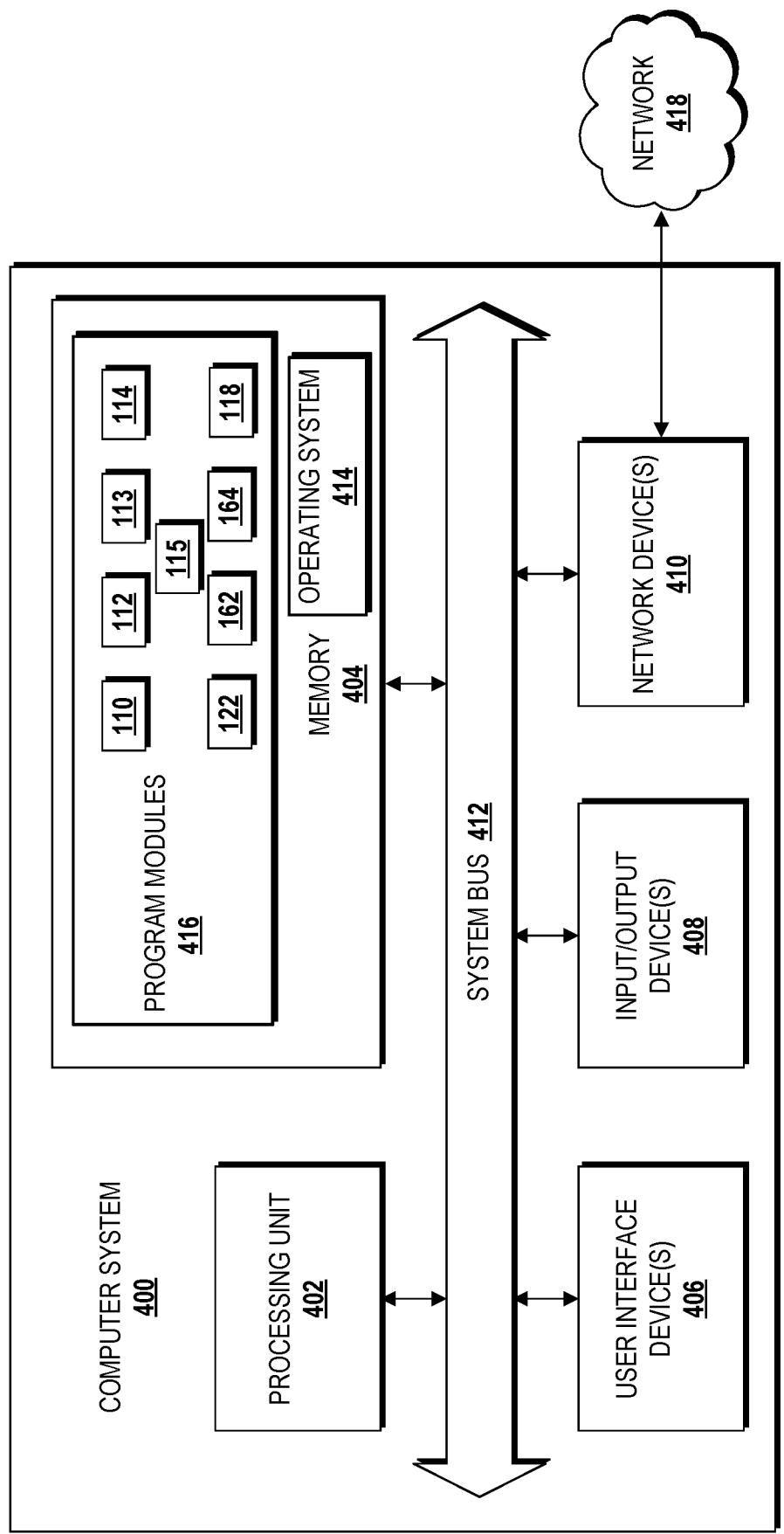
FIG. 4 is a block diagram illustrating an example computer system configured to provide aspects related to network monitoring as a service, according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the UE 138, the NMS 104, one or more of the network components (e.g., the NC A 142, the NC B 146, the NC C 150, and the NC D 154) and/or the SHN measurement database 134 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the network service modules 105, the network measurement service module 110, the network vulnerability service module 112, the network performance optimization service module 113, the network traffic engineering service module 115, the network inference service module 114, the anomaly detection service module 116, the network visualization service module 118, the NMS builder 122, the VNP cache 162, the VNPs 164, the VNP A 144, the VNP B 148, the VNP C 152, the VNP D 156, the network infrastructure service module 124, the data base as a service module 126, the big data as a service module 128, and/or other program modules. These and/or other programs can be embodied in computer-readable media containing instructions that, when executed by the processing unit 402, in some embodiments, may perform and/or facilitate performance of one or more of the method 200 described in detail above with respect to FIG. 2. According to some embodiments, the program modules 416 may be embodied in hardware, software, firmware, or any combination thereof. Although not shown in FIG. 4, it should be understood that the memory 404 also can be configured to store the NM DL 130, the SHN measurements 168, the anonymized network measurements 170, the data file stream 172, the raw network measurements 174, the network measurement adapter 132, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 160). Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
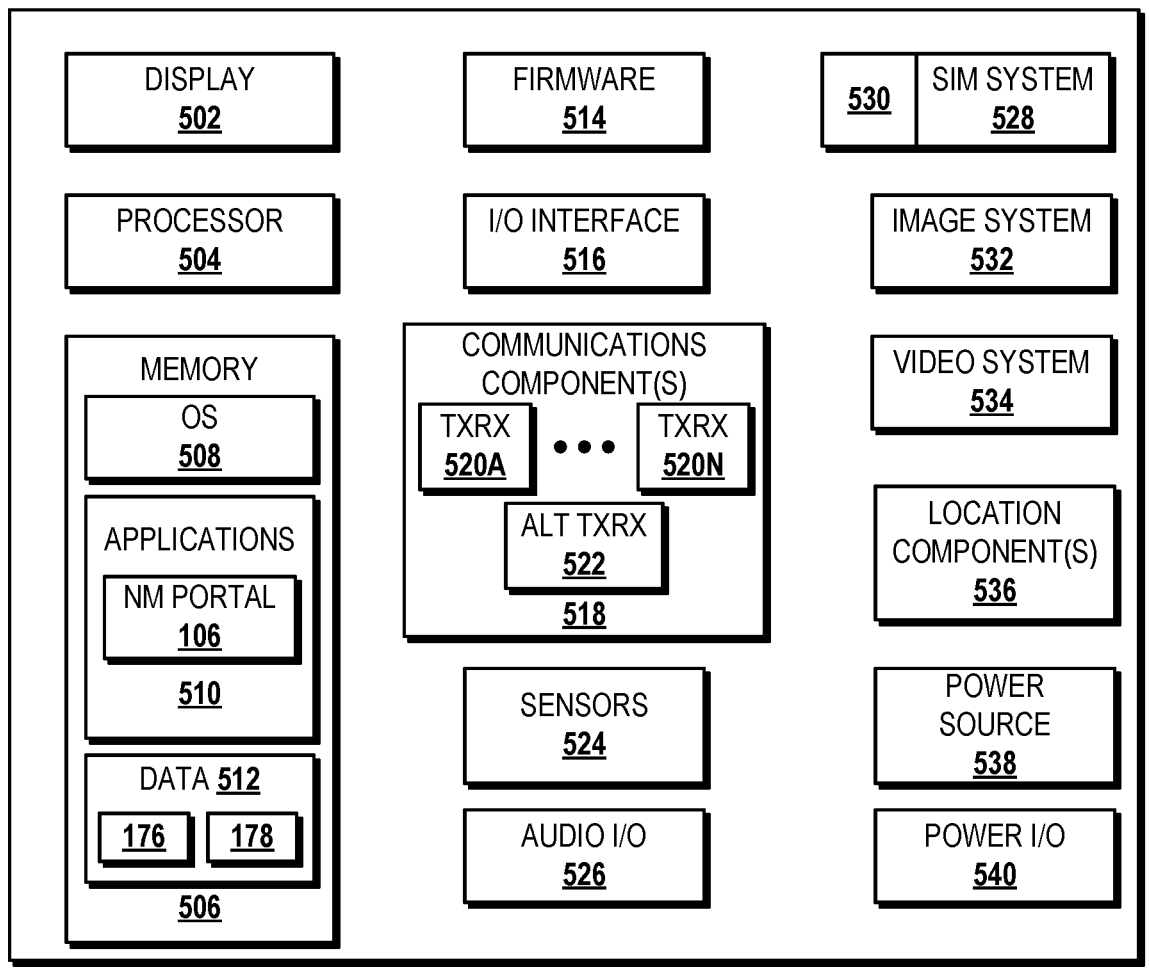
FIG. 5 is a block diagram illustrating an example user equipment capable of implementing aspects of the concepts and technologies described herein.

Turning now to FIG. 5, an illustrative mobile device 500 and components thereof will be described. In some embodiments, the user equipment 138 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, launching the NMP 106, viewing the visualization 178 and/or the performance indicator 176, entering/deleting data, entering and providing the access credentials 184, providing the selection 182, providing the configuration input message 180, entering and/or changing configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, one or more identifiers, and/or other applications or program modules. In some embodiments, the data 512 can include one or more of the visualization 178, the performance indicator 176, the access credentials 184, the selection 182, the network monitoring portal 106, or other data sent among and/or between the UE 138, the SHN 102, and/or the private network 160. According to various embodiments, the applications 510 can include, for example, presence applications, visual voice mail applications, visualization applications, browser applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the NMS builder 122 and the network monitoring portal 106 to facilitate set up of and/or continued interaction with the network monitoring service 104. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Based on the foregoing, it should be appreciated that concepts and technologies directed to providing intelligent and integrated virtual network monitoring as a service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   providing, by a processor of a computer system within a service host network, a network monitoring portal to a user equipment associated with a user that manages a private network, wherein the private network comprises a plurality of network components configured to facilitate operations of the private network;
   receiving, by the processor of the computer system within the service host network via the network monitoring portal, access credentials from the user equipment, wherein the access credentials enable access to the private network;
   receiving, by the processor of the computer system within the service host network from the user equipment via the network monitoring portal, a selection of a plurality of network monitoring service modules provided by the service host network for monitoring the private network;
   identifying, by the processor of the computer system within the service host network, based at least in part on the selection of the plurality of network monitoring service modules received, at least a portion of the plurality of network components of the private network to be monitored;
   based at least in part on the selection of the plurality of network monitoring service modules, instantiating, by the processor of the computer system within the service host network, a plurality of virtual network monitoring probes, wherein each of the plurality of virtual network monitoring probes corresponds to at least one of the plurality of network monitoring service modules selected;
   using, by the processor of the computer system within the service host network, the access credentials received from the user equipment to gain access to the private network; and
   injecting, by the processor of the computer system within the service host network, via access to the private network gained using the access credentials received from the user equipment, the plurality of virtual network monitoring probes within the private network, wherein the plurality of virtual network monitoring probes are activated to monitor at least the portion of the plurality of network components of the private network in response to being injected within the private network.

2. The method of claim 1, wherein the plurality of virtual network monitoring probes are configured to send a data file stream to a network measurement adapter of the service host network.

3. The method of claim 2, further comprising:
   obtaining, by the processor of the computer system within the service host network, the data file stream via the network measurement adapter, wherein the data file stream comprises a plurality of raw network measurements;
   anonymizing, by the processor of the computer system within the service host network, the plurality of raw network measurements within the data file stream; and
   in response to anonymizing, directing the plurality of raw network measurements to at least one of the plurality of network monitoring service modules.

4. The method of claim 3, further comprising concatenating, by the processor, the plurality of raw network measurements with a service host network data stream and historical data in a data lake prior to directing the plurality of raw network measurements to at least one of the plurality of network monitoring service modules.

5. The method of claim 4, further comprising:
   determining, by the processor, a performance indicator via execution of at least one of the plurality of network monitoring service modules; and
   building, by the processor, a visualization based on the performance indicator.

6. The method of claim 5, further comprising providing, by the processor of the computer system within the service host network, the visualization and the performance indicator to the user equipment via the network monitoring portal.

7. The method of claim 1, wherein the plurality of network monitoring service modules comprises a network measurement service module, a network vulnerability service module, a network inference service module, an anomaly detection service module, a network visualization service module, a network performance optimization service module, and a network traffic engineering service module.

8. A system comprising:
   a processor; and
   a memory that stores computer-executable instructions that, in response to being executed by the processor, cause the processor to perform operations comprising:
      providing a network monitoring portal to a user equipment associated with a user that manages a private network, wherein the private network comprises a plurality of network components configured to facilitate operations of the private network, and wherein the system is within a service host network,
      receiving, from the user equipment via the network monitoring portal, access credentials that enable access the private network,
      receiving, from the user equipment via the network monitoring portal, a selection of a plurality of network monitoring service modules provided by the service host network for monitoring the private network,
      identifying, based at least in part on the selection of the plurality of network monitoring service modules received, at least a portion of the plurality of network components of the private network to be monitored,
      based at least in part on the selection of the plurality of network monitoring service modules, instantiating a plurality of virtual network monitoring probes, wherein each of the plurality of virtual network monitoring probes corresponds to at least one of the plurality of network monitoring service modules selected,
      using the access credentials received from the user equipment to gain access to the private network, and
      injecting, via access to the private network gained using the access credentials received from the user equipment, the plurality of virtual network monitoring probes within the private network, wherein the plurality of virtual network monitoring probes are activated to monitor at least the portion of the plurality of network components of the private network in response to being injected within the private network.

9. The system of claim 8, wherein the plurality of virtual network monitoring probes are configured to send a data file stream to a network measurement adapter of the service host network.

10. The system of claim 9, wherein the operations further comprise:
obtaining the data file stream via the network measurement adapter, wherein the data file stream comprises a plurality of raw network measurements;
anonymizing the plurality of raw network measurements within the data file stream; and
in response to anonymizing, directing the plurality of raw network measurements to at least one of the plurality of network monitoring service modules.

11. The system of claim 10, wherein the operations further comprise concatenating the plurality of raw network measurements with a service host network data stream and historical data in a data lake prior to directing the plurality of raw network measurements to at least one of the plurality of network monitoring service modules.

12. The system of claim 11, wherein the operations further comprise:
determining a performance indicator via execution of at least one of the plurality of network monitoring service modules; and
building a visualization based on the performance indicator.

13. The system of claim 12, wherein the operations further comprise providing the visualization and the performance indicator to the user equipment via the network monitoring portal.

14. The system of claim 13, wherein the plurality of network monitoring service modules comprises a network measurement service module, a network vulnerability service module, a network inference service module, an anomaly detection service module, a network visualization service module, a network performance optimization service module, and a network traffic engineering service module.

15. A computer storage medium having computer-executable instructions stored thereon that, in response to execution by a processor of a computer system, cause the processor to perform operations comprising:
providing a network monitoring portal to a user equipment associated with a user that manages a private network, wherein the private network comprises a plurality of network components configured to facilitate operations of the private network, and wherein the computer system is within a service host network;
receiving, from the user equipment via the network monitoring portal, access credentials that enable access the private network;
receiving, from the user equipment via the network monitoring portal, a selection of a plurality of network monitoring service modules provided by the service host network for monitoring the private network;
identifying, based at least in part on the selection of the plurality of network monitoring service modules received, at least a portion of the plurality of network components of the private network to be monitored;
based at least in part on the selection of the plurality of network monitoring service modules, instantiating a plurality of virtual network monitoring probes, wherein each of the plurality of virtual network monitoring probes corresponds to at least one of the plurality of network monitoring service modules selected;
using the access credentials received from the user equipment to gain access to the private network; and
injecting, via access to the private network gained using the access credentials received from the user equipment, the plurality of virtual network monitoring probes within the private network, wherein the plurality of virtual network monitoring probes are activated to monitor at least the portion of the plurality of network components of the private network in response to being injected within the private network.

16. The computer storage medium of claim 15, wherein the plurality of virtual network monitoring probes are configured to send a data file stream to a network measurement adapter of the service host network.

17. The computer storage medium of claim 16, wherein the operations further comprise:
obtaining the data file stream via the network measurement adapter, wherein the data file stream comprises a plurality of raw network measurements;
anonymizing the plurality of raw network measurements within the data file stream; and
in response to anonymizing, directing the plurality of raw network measurements to at least one of the plurality of network monitoring service modules.

18. The computer storage medium of claim 17, wherein the operations further comprise concatenating the plurality of raw network measurements with a service host network data stream and historical data in a data lake prior to directing the plurality of raw network measurements to at least one of the plurality of network monitoring service modules.

19. The computer storage medium of claim 18, wherein the operations further comprise:
determining a performance indicator via execution of at least one of the plurality of network monitoring service modules;
building a visualization based on the performance indicator; and
providing the visualization and the performance indicator to the user equipment via the network monitoring portal.

20. The computer storage medium of claim 19, wherein the plurality of network monitoring service modules comprises a network measurement service module, a network vulnerability service module, a network inference service module, an anomaly detection service module, a network visualization service module, a network performance optimization service module, and a network traffic engineering service module.

* * * * *